(12) United States Patent
Wood et al.

(10) Patent No.: US 12,251,281 B2
(45) Date of Patent: Mar. 18, 2025

(54) DETERMINING SPATIAL RELATIONSHIP BETWEEN UPPER AND LOWER TEETH

(71) Applicant: Mimetrik Solutions Limited, Leeds (GB)

(72) Inventors: David John Wood, Leeds (GB); Cecilie Anneth Osnes, Leeds (GB); Andrew James Keeling, Leeds (GB)

(73) Assignee: Mimetrik Solutions Limited, Leeds (GB)

( * ) Notice: Subject to any disclaimer, the term of this patent is extended or adjusted under 35 U.S.C. 154(b) by 214 days.

(21) Appl. No.: 17/783,193

(22) PCT Filed: Dec. 8, 2020

(86) PCT No.: PCT/GB2020/053143
§ 371 (c)(1),
(2) Date: Jun. 7, 2022

(87) PCT Pub. No.: WO2021/116672
PCT Pub. Date: Jun. 17, 2021

(65) Prior Publication Data
US 2023/0012297 A1 Jan. 12, 2023

(30) Foreign Application Priority Data
Dec. 9, 2019 (GB) .................... 1918006

(51) Int. Cl.
G06T 7/70 (2017.01)
A61C 13/34 (2006.01)
(Continued)

(52) U.S. Cl.
CPC .............. *A61C 19/05* (2013.01); *A61C 13/34* (2013.01); *G06T 7/70* (2017.01); *G06T 17/00* (2013.01);
(Continued)

(58) Field of Classification Search
None
See application file for complete search history.

(56) References Cited

U.S. PATENT DOCUMENTS 6,152,731 A 11/2000 Jordan et al.
6,582,229 B1 6/2003 Miller et al.
(Continued)

FOREIGN PATENT DOCUMENTS

GB 19134691 10/2019
WO 1999015100 A1 4/1999
(Continued)

OTHER PUBLICATIONS

Raphael Destrez et al., "Joint Detection of Anatomical Points on Surface Meshes and Color Images for Visual Registration of 3D Dental Models," Proceedings of SPIE, IEEE, US, vol. 9534, Apr. 30, 2015.
(Continued)

*Primary Examiner* — Robert J Craddock
(74) *Attorney, Agent, or Firm* — Downs Rachlin Martin PLLC

(57) ABSTRACT

A computer-implemented method includes receiving a 3D model of upper teeth (U1) of a patient (P) and a 3D model of lower teeth (L1) of the patient (P1), and receiving a plurality of 2D images, each image representative of at least a portion of the upper teeth (U1) and lower teeth (L1) of the patient (P). The method also includes determining, based on the 2D images, a spatial relationship between the upper teeth (U1) and lower teeth (L1) of the patient (P).

22 Claims, 14 Drawing Sheets

(51) Int. Cl.
  *A61C 19/05*   (2006.01)
  *G06T 17/00*   (2006.01)
  *G06T 19/20*   (2011.01)
  *G06V 10/44*   (2022.01)

(52) U.S. Cl.
  CPC .............. *G06T 19/20* (2013.01); *G06V 10/44* (2022.01); *G06T 2207/30036* (2013.01); *G06T 2219/2004* (2013.01)

(56) References Cited

U.S. PATENT DOCUMENTS

| | | | |
|---|---|---|---|
| 2008/0057478 A1* | 3/2008 | Choi | A61C 9/004 433/215 |
| 2011/0045428 A1 | 2/2011 | Boltunov et al. | |
| 2016/0162631 A1 | 6/2016 | Klein | |
| 2018/0263731 A1 | 9/2018 | Pokotilov et al. | |

FOREIGN PATENT DOCUMENTS

| | | |
|---|---|---|
| WO | 2008028058 A2 | 3/2008 |
| WO | 2009089126 A1 | 7/2009 |
| WO | 2014060595 A1 | 4/2014 |
| WO | 2014139070 A1 | 9/2014 |
| WO | 2018005071 A1 | 1/2018 |
| WO | 2019162164 A1 | 8/2019 |

OTHER PUBLICATIONS

Raphael Destrez et al., "Semi-Automatic Registration of 3D Orthosontics Models From Photographs," Proceedings of SPIE, vol. 8669, Mar. 13, 2013.
Hartley, R. and Zisserman, A., "Multiple view geometry in computer vision." Cambridge University Press, 2003.
Fischler, M.A. and Bolles, R.C., "Random sample consensus: a paradigm for model fitting with applications to image analysis and automated cartography." Communications of the ACM, vol. 24(6), pp. 381-395, Jun. 1981.
Walls, A.W.G., Wassell, R.W. and Steele, J.G., "A comparison of two methods for locating the intercuspal position (ICP) whilst mounting casts on an articulator." Journal of Oral Rehabilitation, 1991, vol. 18, pp. 43-48.
Ullman, S., "The Interpretation of Structure from Motion (No. AI-M-476)." Massachusetts Inst of Tech Cambridge Artificial Intelligence Lab, Oct. 1976.

* cited by examiner

DETERMINING SPATIAL RELATIONSHIP BETWEEN UPPER AND LOWER TEETH

FIELD

The present invention relates to a computer-implemented method of determining a spatial relationship between upper and lower teeth, and a system to determine a spatial relationship between upper and lower teeth.

BACKGROUND

It is often important in dentistry to record the relationship between the upper and lower teeth. This may be a static relationship, such as the maximum inter-cuspal position or other inter-occlusal position. It is also important to record how the teeth function in motion, for example during typical chewing motions or other jaw movements. For example, a knowledge of the relationship between the upper and lower teeth, and as well as their relative movements, assists in in the fabrication of dental prosthetics such as crowns and bridges, allowing the dental laboratory technician to ensure that the prosthetic feels natural in the mouth and is not subject to undue stress.

Traditional methods for determining these relationships may be error-prone and expensive. For example, determining the static relationship between the upper and lower teeth may be carried out by clamping together two poured stone models, respectively cast from impressions of the upper and lower teeth. However, this relies on the dental technician appropriately positioning the models, and the clamping process may introduce an open bite or other alignment error. Similar issues may occur when using a dental articulator.

Modern digital methods may require expensive 3D scanning equipment and may not offer any improvement in accuracy over traditional methods. This is in part because methods for recording dynamic movements require an apparatus to be placed in the patient's mouth, which disturbs the proprioceptive feedback resulting in unnatural jaw movements.

It is an aim of the disclosure to overcome the above-mentioned difficulties, and any other difficulties that may be apparent to the skilled reader for the description herein. It is a further aim of the disclosure to provide a cost-effective and accurate means of determining the static or dynamic relationship between the upper and lower teeth.

SUMMARY

According to the present invention there is provided an apparatus and method as set forth in the appended claim. Other features of the invention will be apparent from the dependent claim, and the description which follows.

According to a first aspect of the disclosure there is provided a computer-implemented method comprising:

receiving a 3D model of upper teeth of a patient and a 3D model of lower teeth of the patient;

receiving a plurality of 2D images, each image representative of at least a portion of the upper teeth and lower teeth of the patient; and determining, based on the 2D images, a spatial relationship between the upper teeth and lower teeth of the patient.

Determining, based on the 2D images, a spatial relationship between the upper teeth and lower teeth of the patient, may comprise: determining an optimal alignment of the 2D images to one of the 3D model of upper teeth and the 3D model of lower teeth, and determining an optimal alignment between the one of the 3D model of upper teeth and the 3D model of the lower teeth and the other of the 3D model of upper teeth of a patient and the 3D model of lower teeth.

Determining the optimal alignment may comprise, for each of the 2D images: rendering a 3D scene based on a current estimate of a camera pose at which one the 2D image was captured and the spatial relationship between the 3D model of upper teeth of a patient and the 3D model of lower teeth; extracting a 2D rendering from the rendered 3D scene based on the current estimate of the camera pose; comparing the 2D rendering to the 2D image to determine a cost score indicative of a level of difference between the 2D rendering and the 2D image. Determining the optimal alignment may comprise using an optimiser, preferably a non-linear optimiser, to iteratively obtain the optimal alignment over all of the 2D images.

The cost score may comprise a mutual information score calculated between the 2D rendering and the 2D image. The cost score may comprise a similarity score of corresponding image features extracted from the 2D rendering and the 2D image. The image features may be corner features. The image features may be edges. The image features may be image gradient features. The similarity score may be one of Euclidian distance, random sampling or one-to-oneness. The rendering and the 2D image may be pre-processed before calculating the mutual information score. A convolution or filter may be applied to the rendering and the 2D image.

The cost score may comprise a closest match score between the 2D rendering and the 2D image. The closest match score may be based a comparison of 2D features from the 2D rendering and 2D features from the 2D image.

The cost score may comprise a 2d-3d-2d-2d cost, calculated by: extracting 2D image features from the rendered 3D scene; re-projecting the extracted features on to the rendered 3D scene; extracting image features from the 2D image; re-projecting the extracted features from the 2D image onto the rendered 3D scene, and calculating a similarity measure indicative of the difference between the re-projected features in 3D space.

The cost score may comprise an optical flow cost, calculated by tracking pixels between consecutive images of the plurality of 2D images. The optical flow cost may be based on dense optical flow. The tracked pixels may exclude pixels determined to be occluded.

Determining the cost score may comprise determining a plurality of different cost scores based on different extracted features and/or similarity measures. The cost scores used in each iteration by the optimiser may differ. The cost scores may alternate between a first selection of cost scores and a second selection of the cost scores, wherein one of the first and second selection comprises the 2d-3d-2d-2d cost, and the other does not.

The plurality of 2D images may each show the upper teeth and the lower teeth in substantially the same static alignment.

The plurality of 2D images may each comprise at least a portion of the upper teeth and lower teeth of the patient. The plurality of 2D images may be captured whilst moving a camera around a head of the patient.

The plurality of 2D images may each comprise at least a portion of a dental model of the upper teeth of the patient and a dental model of the lower teeth of the patient in occlusion. The plurality of 2D images may be captured whilst moving a camera around the model of the upper teeth of the patient and the model of the lower teeth of the patient held in occlusion. The model of the upper teeth may comprise a marker. The model of the lower teeth may comprise a marker. The determination of the optimal alignment of the 2D images to one of the 3D model of the upper teeth and the 3D model of the lower teeth may be based on markers placed on the dental models.

The method may comprise: determining a first spatial relationship between the upper teeth and lower teeth of the patient in a first position; determining a second spatial relationship between the upper teeth and lower teeth of the patient in a second position; determining a spatial transformation between the first spatial relationship and the second relationship. Determining the spatial transformation may comprise determining a transverse hinge axis. The first position may be a closed position. The second position may be an open position.

The plurality of 2D images may comprise a plurality of sets of 2D images, each set of 2D images comprising concurrently captured images of the face of the patient from different viewpoints. The plurality of 2D images may comprise videos of the upper teeth and the lower teeth in motion, captured concurrently from different viewpoints. The method may comprise determining the spatial relationship based on each set of 2D images. The method may comprise determining a region of the 3D model of the upper teeth that is in contact with the 3D model of the lower teeth in each set of 2D images, and displaying the region on a 3D model of the upper teeth or lower teeth.

According to a second aspect of the disclosure there is provided a system comprising a processor and a memory. The memory stores instructions that, when executed by the processor, cause the system to perform any of the methods set forth herein.

According to a further aspect of the invention there is provided a tangible non-transient computer-readable storage medium having recorded thereon instructions which, when implemented by a computer device, cause the computer device to be arranged as set forth herein and/or which cause the computer device to perform any of the methods set forth herein.

According to a further aspect of the invention there is provided a computer program product comprising instructions, which when the program is executed by a computer, cause the computer to carry out any of the methods set forth herein.

BRIEF DESCRIPTION OF DRAWINGS

For a better understanding of the invention, and to show how examples of the same may be carried into effect, reference will now be made, by way of example only, to the accompanying diagrammatic drawings in which.

Figure 1:
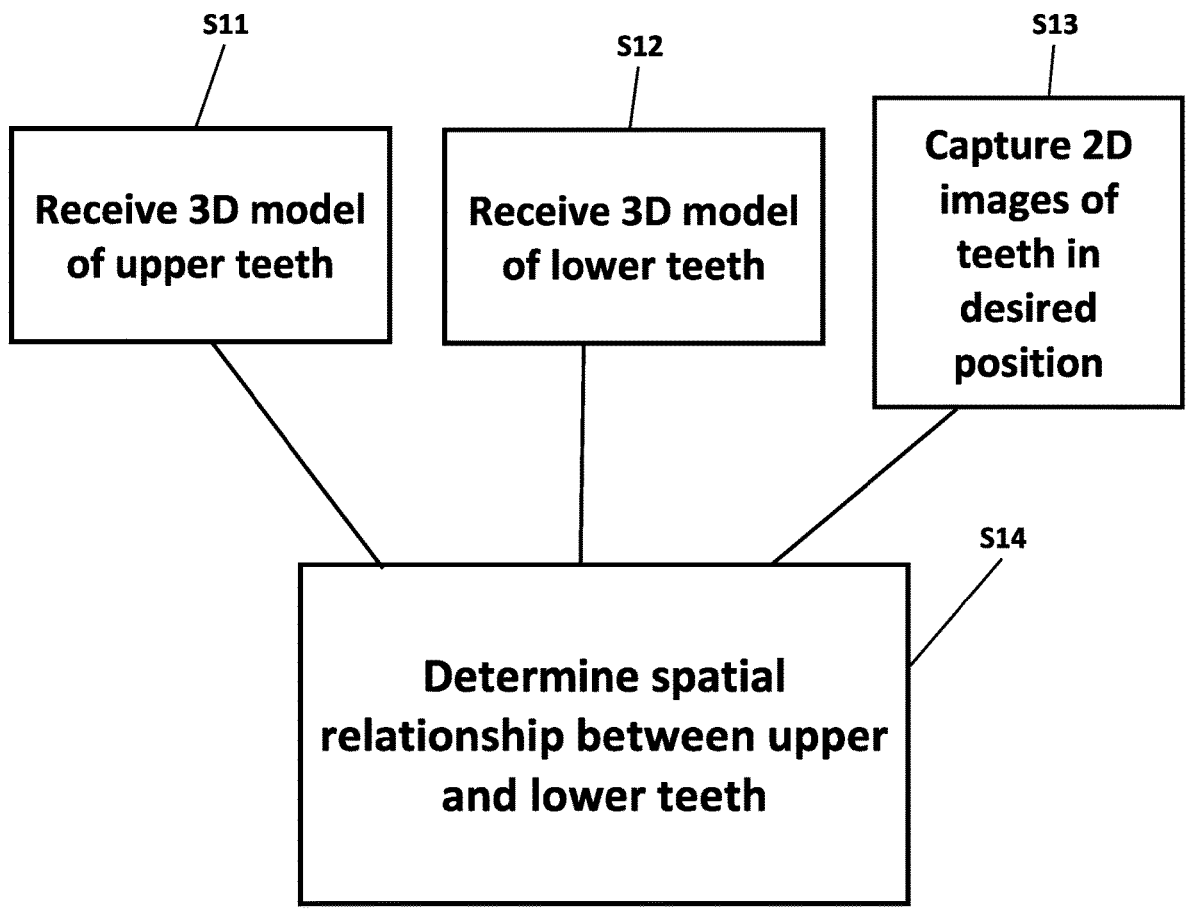
FIG. 1 is a schematic flowchart of a first example method of determining a spatial relationship between the upper teeth and lower teeth of a patient.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example examples. Also, common but well-understood elements that are useful or necessary in a commercially feasible example are often not depicted in order to facilitate a less obstructed view of these various example examples.

DESCRIPTION OF EMBODIMENTS

In overview, examples of the disclosure provide a means of determining a spatial relationship between the upper teeth and the lower teeth, based on a plurality of 2D images, each image comprising at least a portion of the upper teeth and lower teeth. The plurality of 2D images may be used to align a 3D model of the upper teeth with a 3D model of the lower teeth. In some examples, the plurality of 2D images comprise a video captured by a camera moving around the face of the patient, or cast stone models of the upper and lower teeth being held in occlusion. In other examples, the plurality of 2D images comprise a plurality of concurrently-captured videos of the face of the patient, each of the concurrently-captured videos being captured from a different view point.

FIG. 1 illustrates an example method of determining the spatial relationship between the upper teeth and the lower teeth. In the example of FIG. 1, the spatial relationship is a static spatial relationship, such as the maximum inter-cuspal position.

In block S11, a 3D model is received of a patient's upper teeth. In block S12, a 3D model is received of the patient's lower teeth.

The 3D models of the upper and lower teeth may be obtained using a suitable 3D dental scanner. For example, the dental scanner described in the applicant's pending UK patent application GB1913469.1, may be used. The dental scanner may be used to scan impressions taken from the upper teeth and lower teeth, stone models cast from the impression, or a combination of impressions and stone models.

In further examples, the 3D models may be obtained by other commercially available scanners, which may either scan stone models or take the form of intra-oral scanners suitable for placement in a patient's mouth.

The 3D models may each take the form of a data file in the STL or PLY format, or any other data format suitable for storing a 3D model.

In block S13, a plurality of 2D images are captured. Each of the 2D images comprises at least a portion of the upper teeth and a portion of the lower teeth, held in a desired static spatial relationship.

Figure 2:
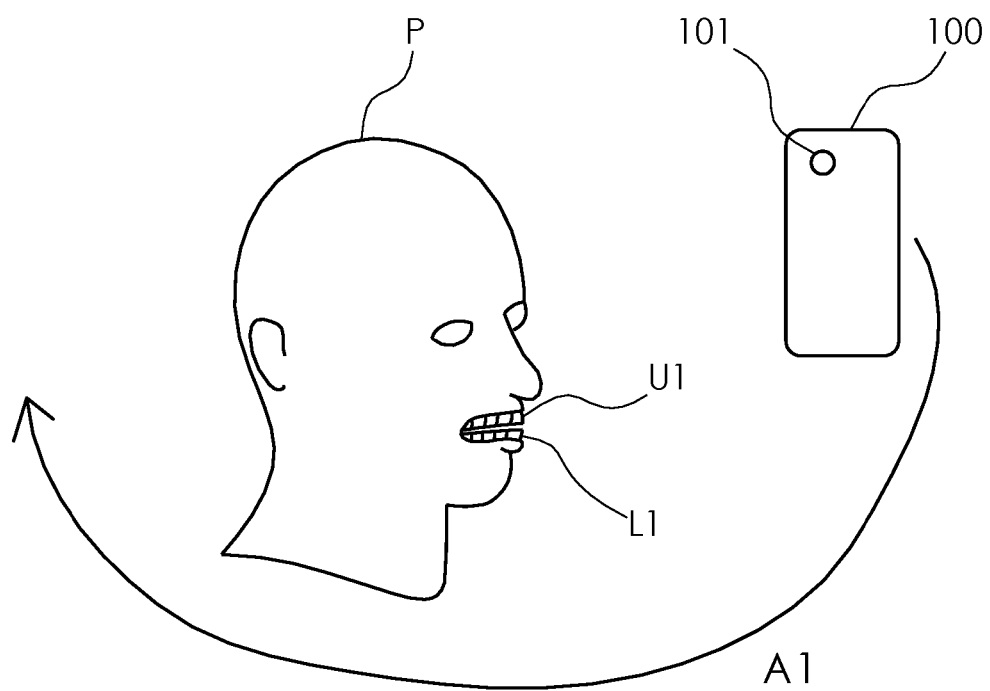
FIG. 2 is a schematic perspective illustrating an example method of capturing 2D images comprising at least a portion of the upper teeth and lower teeth of the patient.

FIG. 2 illustrates an example method of capturing the 2D images. As shown in FIG. 2, the 2D images may be captured by a single camera 101, which may for example be a camera of a smartphone 100. The camera 101 may be placed in a video capture mode, such that it captures images at a predetermined frame rate. The camera 101 is then moved in an arc A1 around the face of a patient P, who is holding their upper teeth U1 and lower teeth L1 in the desired static spatial relationship. The teeth U1 and L1 are at least partially visible to the camera, because the patient P is holding apart their lips or they are retracted by other standard dental means.

Accordingly, a plurality of 2D images are captured, each 2D image comprising at least a portion of the upper teeth and lower teeth of the patient.

In one example, the camera 101 is calibrated before capturing the 2D images. Particularly, the camera 101 may undergo a calibration process in order to determine, or estimate, the parameters of the lens and image sensor of the camera 101, so that these parameters can be used to correct for phenomena such as lens distortion and barrelling (also referred to as radial distortion), allowing for accurate 3D scene reconstruction. The calibration process may also determine the focal length and optical centre of the camera 101. The calibration process may involve capturing images of an object with known dimensions and geometry, and estimating the parameters of the lens and image sensor based thereon. Example methods of calibrating the camera may be as described in Hartley, R. and Zisserman, A., 2003. *Multiple view geometry in computer vision*. Cambridge university press, the contents of which are incorporated herein by reference.

Returning to FIG. 1, in block S14, the spatial alignment of the upper and lower teeth is determined. The 2D images are used to align the 3D models of the upper and lower teeth, thereby such the spatial alignment of the models corresponds to the relative alignment of the models as shown in the captured image. The method of aligning the upper and lower teeth using the 2D images will be discussed in detail below with reference to FIG. 3-5.

Figure 3:
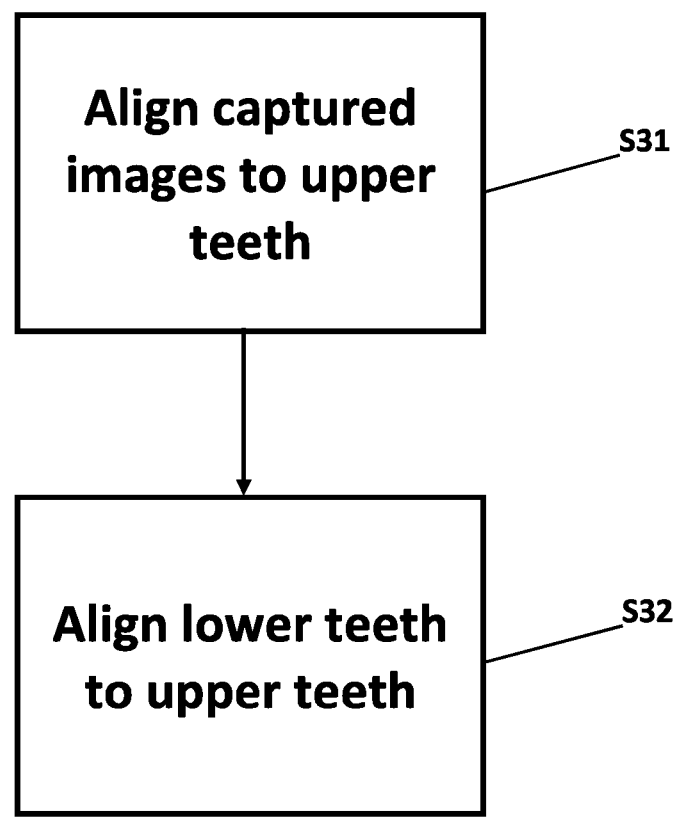
FIG. 3 is a schematic flowchart illustrating the example method of FIGS. 1 and 2 in more detail.

FIG. 3 illustrates the process of block S14 of FIG. 1 in more detail. The process estimates the pose of the upper and lower teeth and the camera pose (i.e. the position of the camera 101) in each 2D image captured by the camera 101.

In a first step S31, the captured images are aligned to the upper teeth, so as to determine camera poses with respect to the upper teeth. In one example, an initial guess for the camera pose of a first captured image of the images captured by the camera 101 is received. This may be carried out via user input—for example by a user dragging the model so as to align it with the first captured image via a user interface. In another example, a standardised videoing protocol may be used. For example, the user capturing the images may be instructed to begin the video with the camera 101 directed to a certain part of the face of the patient P, so that an approximate pose of the first image is known.

In a second step S32, the transformation $T_{lower}$ to align the lower teeth L1 with the upper teeth U1 is optimised simultaneously over all of the captured 2D images. Accordingly, a determination of the alignment of the lower teeth L1 and upper teeth U1 is determined. In some examples, the camera poses and the transformation $T_{lower}$ are then iteratively optimised simultaneously.

Figure 4:
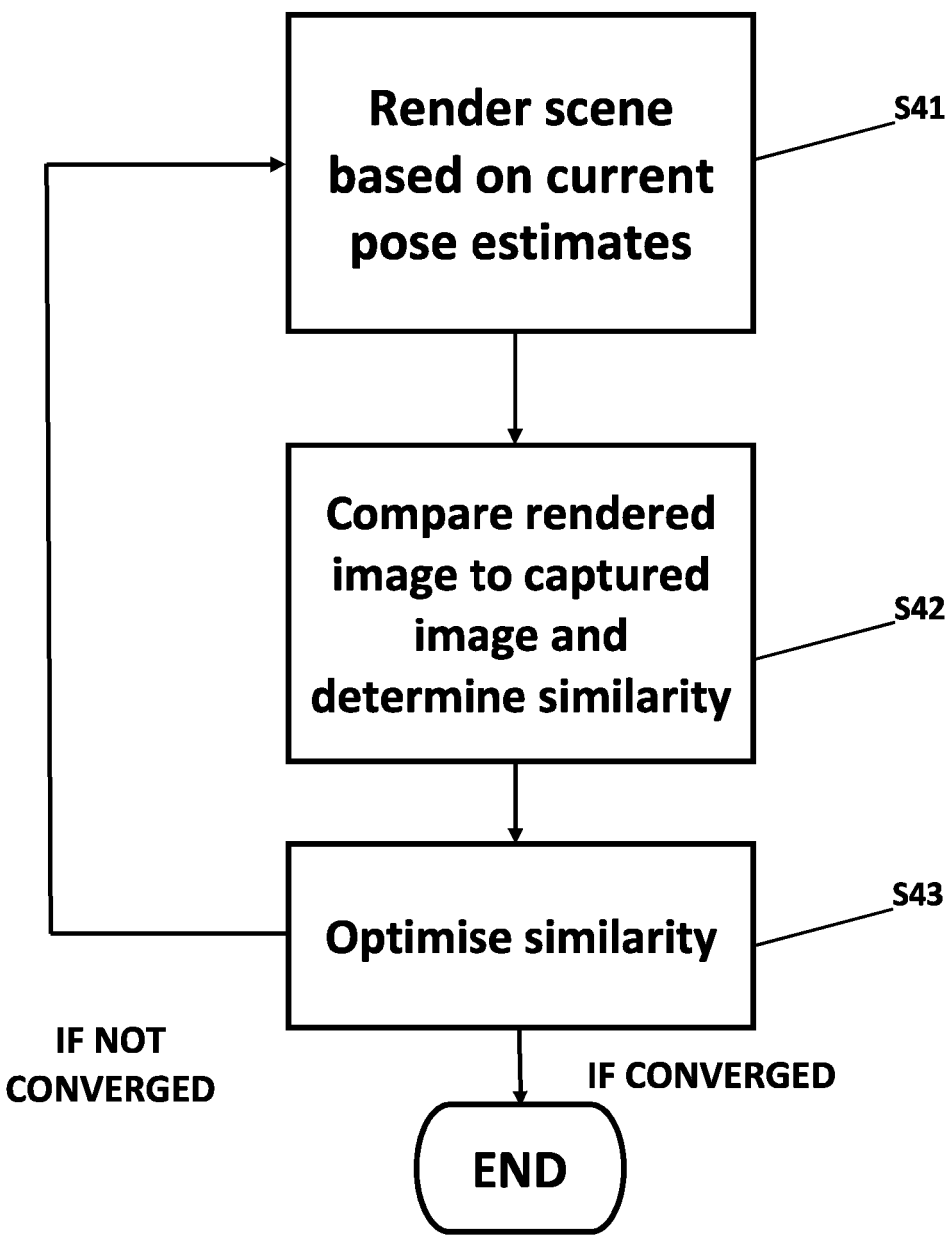
FIG. 4 is a schematic flowchart illustrating the example method of FIG. 1-3 in more detail.
Figure 5:
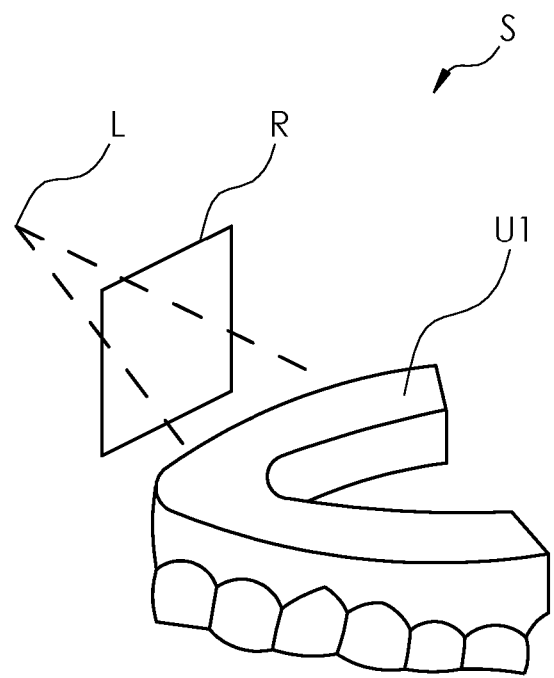
FIG. 5 is a schematic diagram illustrating the example method of FIG. 1-4 in more detail.
Figure 5:
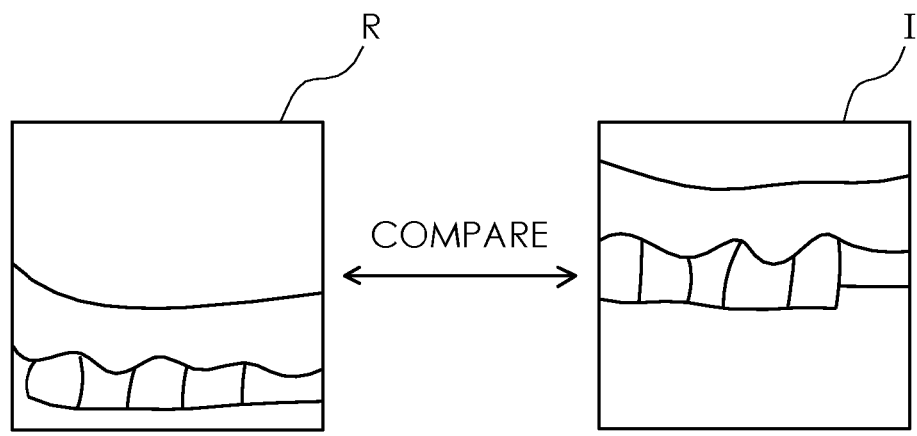

The method of aligning the 3D models with the 2D images will now be described with reference to FIGS. 4 and 5.

In block S41, a 3D rendering of the scene S is carried out based on the current estimation of the camera pose C and the model U1 pose. This results in a 2D rendered image R of the current estimate of the scene, as viewed from the estimate of the camera position C.

In block S42, the rendered image R is compared to the 2D captured image I, so as to score the current estimate of the model pose and camera pose. The higher the degree of similarity between the captured image and the rendered image I, the greater the likelihood that the estimate is correct.

In order to assess the similarity of the rendered image R and the captured image I, a similarity metric may be calculated. The metric may output a cost score, wherein a higher cost score indicates a higher degree of difference between the rendered image R and the captured image I.

In one example, a mutual information (MI) score is calculated between the rendered image R and the captured image I. The MI may be calculated based directly on the rendered image R and the captured image I. However, in further examples, the rendered image R and captured image I may be processed in different ways before the calculation of the MI, to enhance the effectiveness of the MI score. For example, a filter such as Sobel gradient processing, or another image convolution, either machine-learnt or designed, may be applied to the rendered image R and the captured image I.

In one example, feature extraction is carried out on each of the rendered image R and the captured image I, so as to extract salient features (e.g. regions or patches) therefrom. For example, an edge extraction method is applied to extract edge points or regions from each of the rendered image R and the captured image I. In another example, a corner extraction method is applied to extract corner points or regions from each of the rendered image R and the captured image I. In further examples, other features may be extracted. For example, image-gradient features or other machine-learned salient features, for example learned with a convolutional neural network, may be extracted.

Corresponding salient features respectively extracted from the rendered image R and the captured image I are then matched, to determine the similarity therebetween. For example, the matching may employ a similarity measure such as the Euclidean distance between the extracted points, random sampling of the extracted points as discussed in Fischler, M. A. and Bolles, R. C., 1981. Random sample consensus: a paradigm for model fitting with applications to image analysis and automated cartography. *Communications* of the ACM, 24(6), pp. 381-395, or measures such as one-to-oneness.

In a further example, a cost referred to herein as a 2d-3d-2d-2d cost is calculated as follows.

Firstly, 2D features (edges/corners/machine-learnt or human-designed convolutions) are extracted from the 2D image R of the current 3D render guess, which results in a point set A2. Next, those 2D features are re-projected back onto the 3D render to give a set of 3D points (point set A3).

In the 2D camera image I, corresponding 2D features are extracted (point set B2). Next correspondences are assigned between B2 and A2, generally using a closest point search, but this may be augmented with a closest similarity factor too. Subsequently, the equivalent 3D correspondences (A3) are calculated, resulting in a set of 2D-3D correspondences B2-A3. Now the task is to minimize the 2D reprojection error of points A3 (referred to as A2'), by optimising the camera or model pose, such that B2-A2' is minimized.

Conceptually this score involves marking edge points (or other salient points) on the 3D model, finding the closest edge points on the 2D camera image, then moving the model so that the reprojection of those 3D edge points coincides with the 2D image points.

The whole process is then repeated iteratively because in each iteration, the edge points marked on the 3D model, and their corresponding camera-image 2D points are increasingly likely to be genuine correspondences.

A further cost is to extract 2d features from the rendered image R (which again, may be pre-processed, for example using a silhouette render) and the 2d features from the camera image. The closest matches between the two images are found and then used as a current cost score, which is directly fed-back to the optimiser, which may then adjust the model (or camera) pose a little and recalculate the render. This method differs from the 2d-3d-2d-2d cost in that the correspondences are updated every iteration, with the correspondence distances being used as a score to guide the optimiser, whereas the 2d-3d-2d-2d cost is calculated by iterating to minimise the current set of correspondences (i.e. an inner loop), then recalculating the render, then getting new correspondences and iterate around again (outer loop).

Another cost score may be calculated using optical flow. Optical flow techniques track pixels between consecutive frames in a sequence. As the frames are consecutively recorded, if the tracked position of a pixel in the rendered image R is significantly different to the tracked position of the pixel in the captured image I, it is an indication that the estimate of the model and camera pose is inaccurate.

In one example, the optical flow prediction is carried out forwards, i.e. based on the preceding frames of the captured video. In one example, the optical flow prediction is carried out backwards, in that the order of the frames of the video is reversed such that the optical flow prediction based on succeeding frames may be calculated.

In one example, a dense optical flow technique is employed. The dense optical flow may be calculated for a subset of the pixels in the images. For example, the pixels may be limited to pixels that, based on their position, are assumed to be in a plane substantially orthogonal to a vector extending from the optical centre of the camera. In one example, pixels may be determined to occluded by the face of the patient P (e.g. by the nose), based on a facial model fitted to the face. Such pixels may then be no longer tracked by optical flow.

In one example, a plurality of the above-described methods are applied so as to determine a plurality of different cost scores based on different extracted features and/or similarity measures.

The process of block S41 and S42 is carried out for a plurality of the captured images. For example, the process may be carried out for all of the captured images. However, in other examples a subset of the captured images may be chosen. For example, a sub-sample of the captured images may be chosen. The sub-sample may be a regular sub-sample, such as every other captured image, every third captured image or every tenth captured image.

Accordingly, a plurality of cost scores are derived that reflect the similarity between each captured image and its corresponding rendered image based on the estimated position of the model and the estimated position of the camera.

In one example, the difference in the estimated camera pose between consecutive frames may be calculated as an additional cost score. In otherwords, the distance between the estimated camera pose of the present image and the previously captured frame may be calculated, and/or the distance between the estimated camera pose of the present image and the subsequently captured frame may be calculated. As the images are captured consecutively, large differences in the camera pose between consecutive frames is indicative of an incorrect estimate.

In block S43, the cost scores of each of the images are fed to a non-linear optimiser, which iterates the processes of block S41 and S42, adjusting the camera poses and model poses at each iteration. A solution is arrived at that simultaneously optimises over each of the captured images. The iteration stops when a convergence threshold has been reached. In one example, the non-linear optimiser employed is the Levenberg—Marquardt algorithm. In other examples, other algorithms may be employed, from software libraries such as Eigen (http://eigen.tuxfamily.org/), Ceres (http://ceres-solver.org/) or nlopt (https://nlopt.readthedocs.io).

In a further example, the cost scores used in each iteration may differ. In other words, a selection of the above-mentioned scores are calculated in each iteration, wherein the selection may differ from iteration to iteration. For example, the method may alternate between a first selection of the above-mentioned scores and a second selection of the above-mentioned scores. In one example, one of the first and second selection comprises the 2d-3d-2d-2d cost, and the other does not. By using a variety of cost metrics in the above-described manner, a more robust solution may be found.

Figure 6:
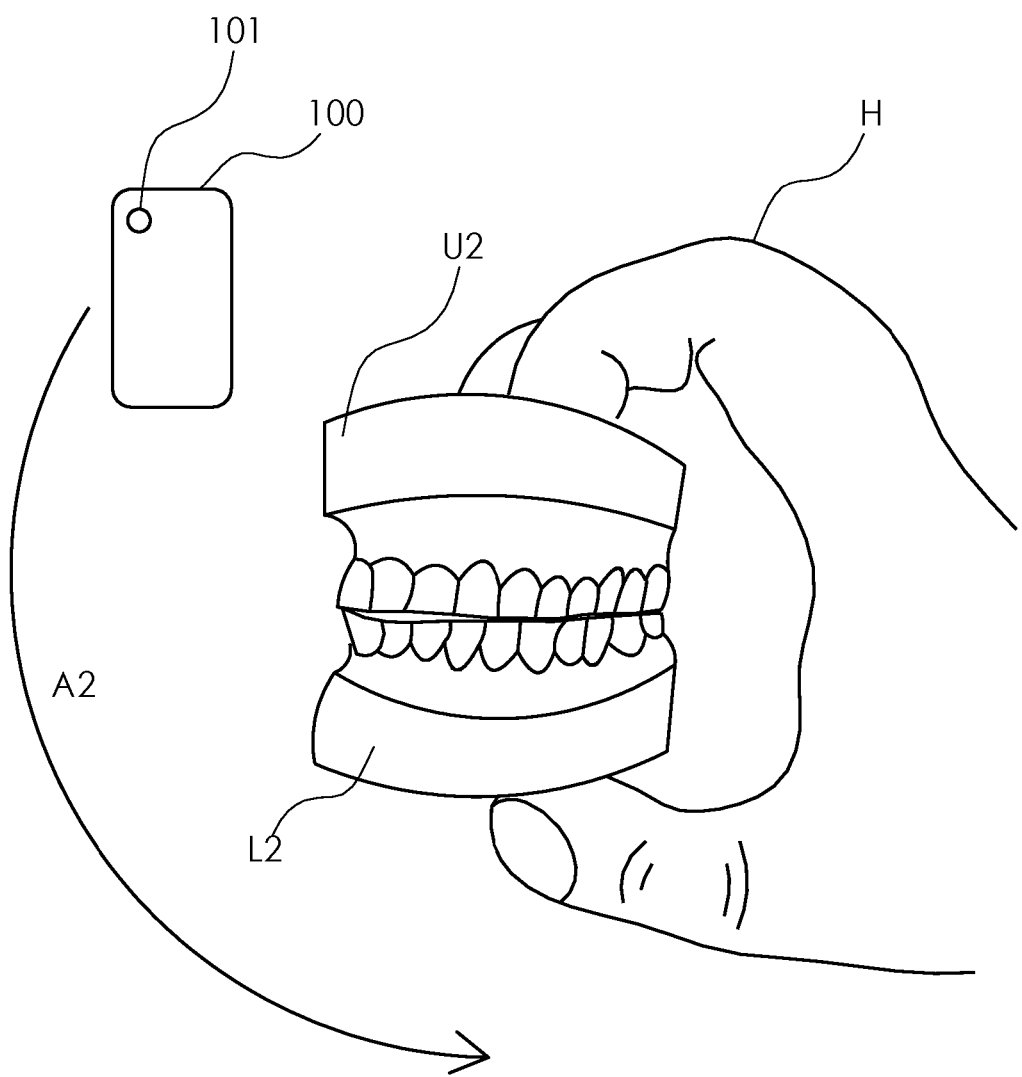
FIG. 6 is a schematic perspective illustrating an example method of capturing 2D images comprising at least a portion of the upper teeth and lower teeth of the patient.

FIG. 6 illustrates a further example of method of determining the spatial relationship between upper and lower teeth. FIG. 6 corresponds substantially to the method described above with reference to FIG. 1-5. However, rather than passing the camera 101 around the face of patient P, the camera 101 is instead moved around a model of the upper teeth U2 and a model of lower teeth L2. The models U2, L2 are cast from dental impressions of take of the upper and lower teeth U1, L1 of the patient P. Furthermore, the models U2, L2 are held in occlusion by the hand H of a dental technician. This method takes advantage of the fact that hand articulation of the intercuspal position by experienced practitioners is relatively accurate (Walls, A. W. G., Wassell, R. W. and Steele, J. G., 1991. A comparison of two methods for locating the intercuspal position (ICP) whilst mounting casts on an articulator. *Journal of oral rehabilitation*, 18(1), pp. 43-48). Furthermore, the teeth of the models U2, L2 are not obscured by the lips, which may facilitate accurate alignment.

In one example, one or both of the dental models U2, L2 may be marked with markers.

The markers may for example take the form of QR codes or coloured marks. The markers need not form part of the scanned 3D models, and accordingly the markers may be applied to the dental models U2, L2 after they have been scanned. The markers are then used to determine the camera pose with respect to the models, using a standard structure-from-motion technique. For example, the technique may be the technique set out in Ullman, S., 1976. *The Interpretation of Structure from Motion* (No. AI-M-476). MASSACHUSETTS INST OF TECH CAMBRIDGE ARTIFICIAL INTELLIGENCE LAB. Accordingly, this technique may replace the step S31 set out above.

Figure 7:
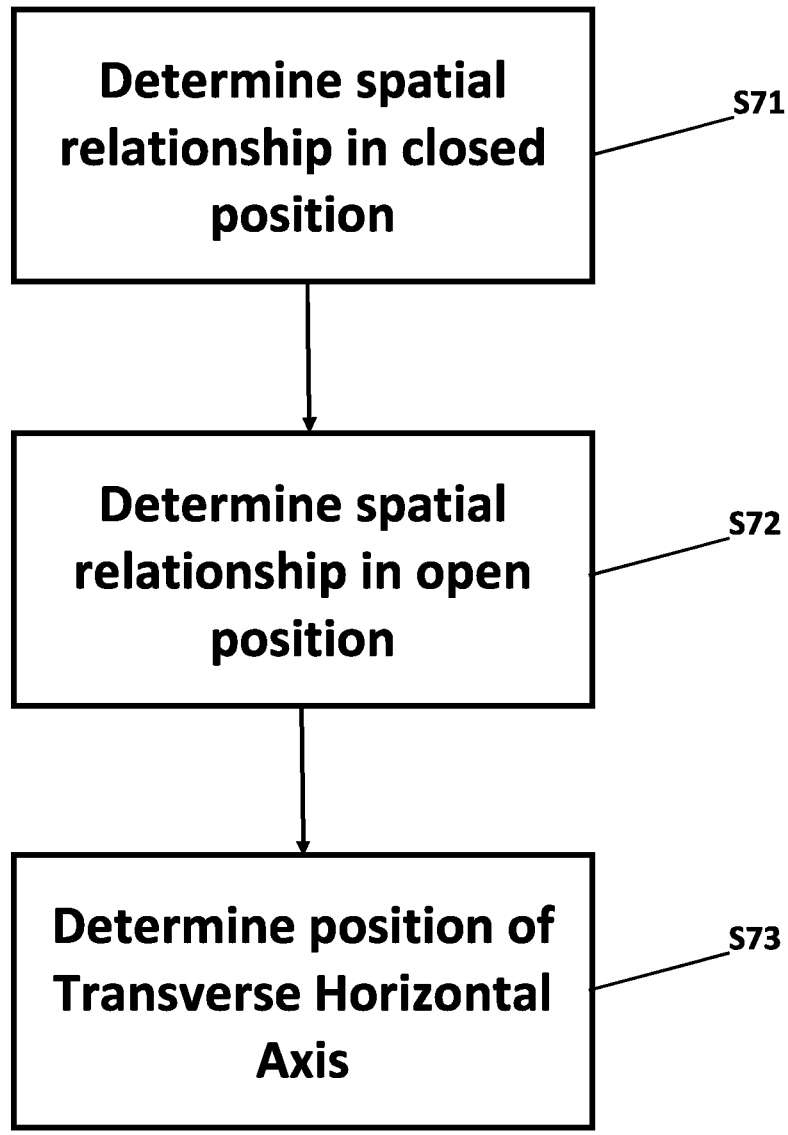
FIG. 7 is a schematic flowchart of an example method of calculating the transverse horizontal axis.
Figure 8A:
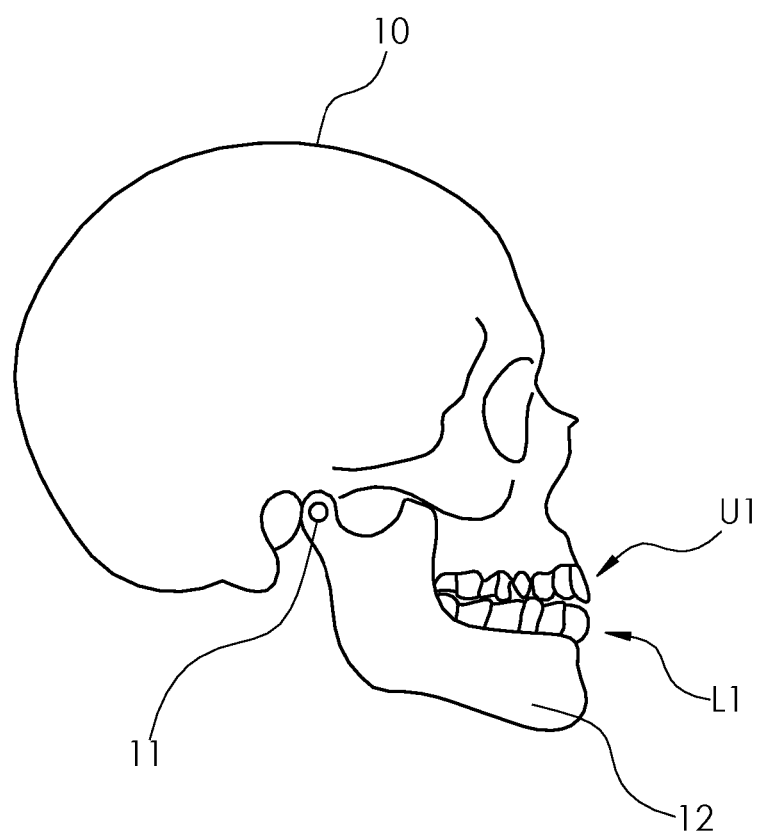
FIGS. 8A and 8B are schematic diagrams illustrating the transverse horizontal axis of a patient.
Figure 8B:
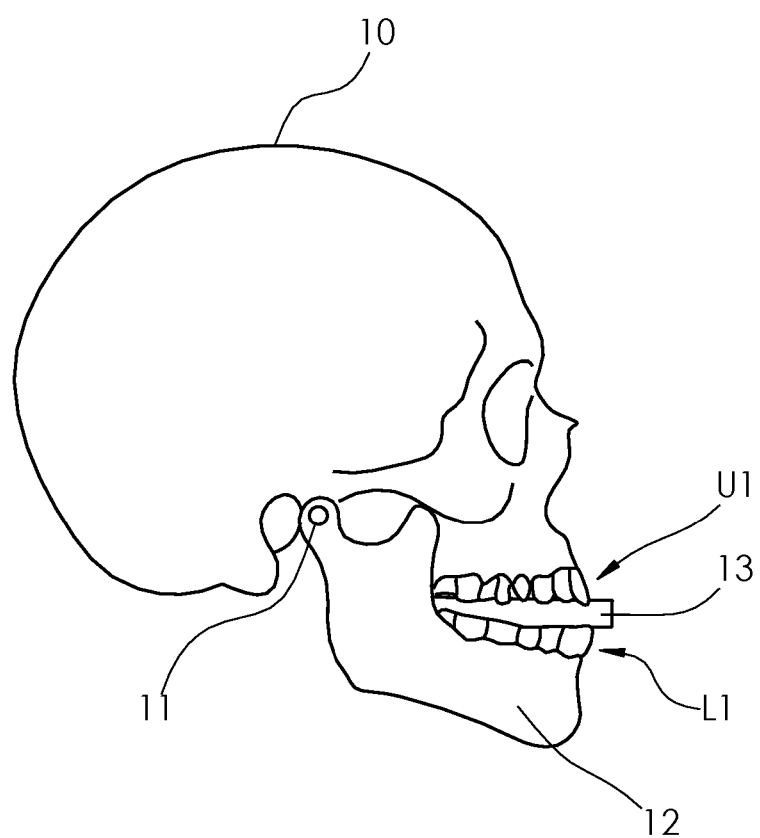

FIG. 7 illustrates an example method of determining a patient's transverse horizontal axis (THA). This is illustrated in FIGS. 8A and 8B, which respectively show a patient's skull 10 with the jaw 12 in a closed and open position. The THA 11 is the hinge axis above which the lower jaw may rotate during purely rotational opening and closing of the mouth. In FIG. 8B, a device 13 is inserted between the teeth U1, L1, in order to hold them apart in a static manner. The device 13 may be an anterior jig or deprogrammer.

In block S71 of FIG. 7, the spatial relationship of the upper and lower teeth U1, L1 is determined with the jaw 12 in the almost-closed position as shown in FIG. 8A. In block S72, the spatial relationship of the upper and lower teeth U1, L1 is determined with the jaw 12 in an open position (up to 20 mm of opening), for example as shown in FIG. 8B. In each case, the mandible may be postured in centric In block S73, the THA is determined, based on the different position of the lower teeth L1 with respect to the upper teeth U1 in the two spatial alignments.

In one example, the axis is determined by aligning a plurality of points (e.g. 3 points) in both scans of the upper teeth U1 to create a common coordinate system. Then a 3×4 transformation matrix is calculated that represents the movement of a plurality of points in the scans of the lower teeth L1, from the closed to the open position. The upper left 3×3 sub-matrix of the transformation matrix may then be used to calculate the orientation of the axis of rotation, and the degree of rotation around the axis.

There are an infinite number of spatial locations for this axis, each with a different translation vector applied following the rotation. In order to find the position of the THA, a point is tracked from the start position to the end position. A solution is found that constrains the translation vector to a direction coincident with the calculated axis. This solution can be found using closed-form mathematics (for example, Singular Value Decomposition) or via other open-form optimisation methods such as gradient descent. This provides a vector equivalent to a point on the axis, and also the magnitude of the translation vector along the axis. The latter vector should theoretically be zero.

In further examples, spatial alignments of the upper and lower teeth may be determined for a plurality of positions, for example by using jigs or deprogrammers of a variety of thicknesses, in order to hold the jaw at various degrees of openness. This may then allow a plurality of the spatial alignments to be used to calculate the hinge axis.

In another example, the spatial relationship of the upper and lower teeth U1, L1 are determined in protrusive or lateral static registration. From such registrations, anterior or lateral guidance may be estimate. Accordingly, based on determinations of the spatial alignment of the teeth in various static poses, an estimate of dynamic jaw movement can be made.

Figure 9:
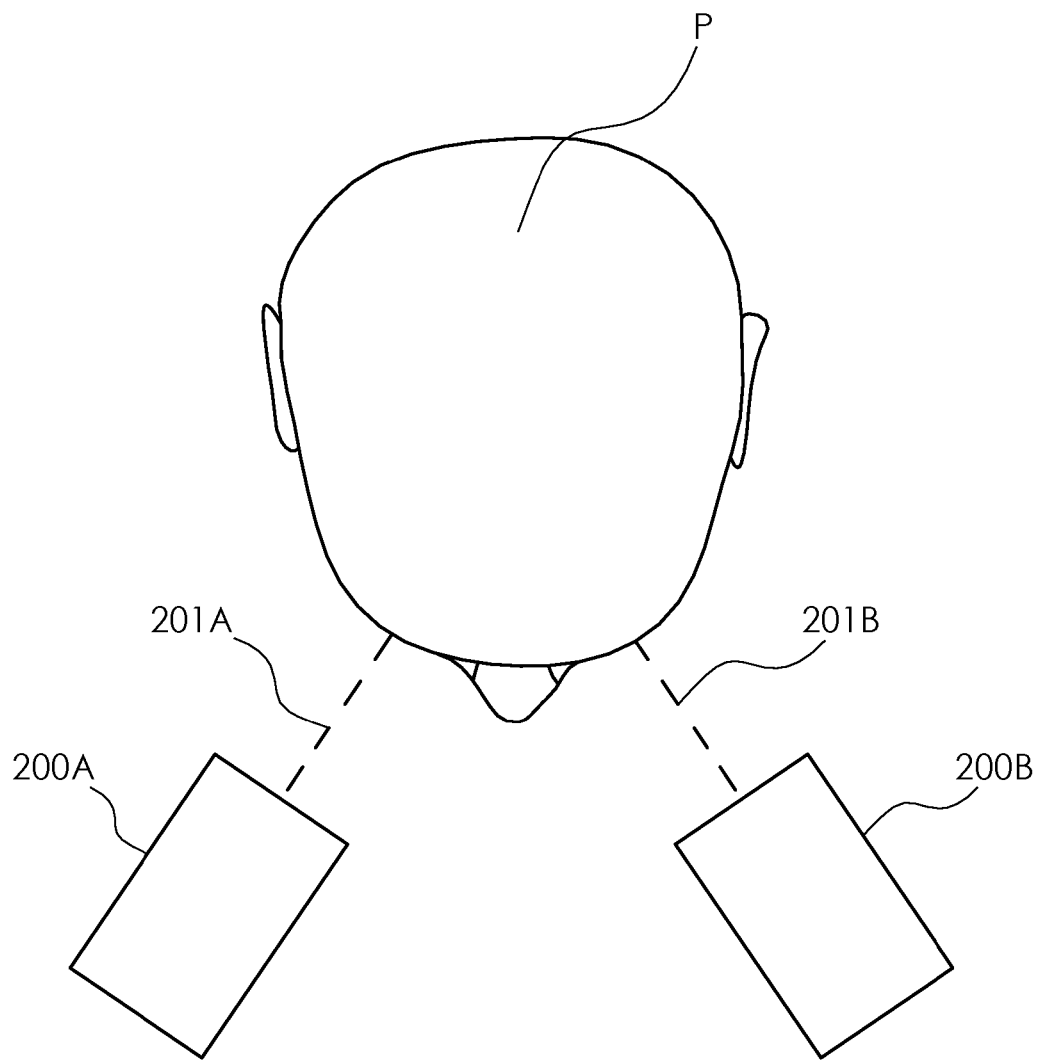
FIG. 9 is a schematic diagram illustrating a method of capturing 2D images comprising at least a portion of the upper teeth and lower teeth of the patient.

Turning now to FIG. 9, another example of the disclosure is illustrated. In this example, two cameras 200A, 200B are employed. In contrast to the examples described above, the cameras 200A,B are provided at a fixed position. That is to say, the cameras 200A,B are fixed with respect to each other, and do not move during image capture. For example, the cameras 200A,B may be supported at the fixed position by means of a suitable stand, jig or other support mechanism (not shown).

The cameras 200A,B are positioned so that each camera has a different viewpoint, and thus captures images of a different part of the mouth. The line of sight of each camera 200 is represented by the dotted lines 201A and 201B. For example, in FIG. 9, the camera 200A is positioned to capture images of the right side of the face of the patient P, and the camera 200B is positioned to capture images of the left side of the face of the patient P.

The cameras 200A,B are configured to operate synchronously. In other words, the cameras 200A,B can simultaneously capture images at particular time index. Accordingly, the cameras 200A,B provide two simultaneously captured viewpoints of the mouth of the patient P.

Figure 10:
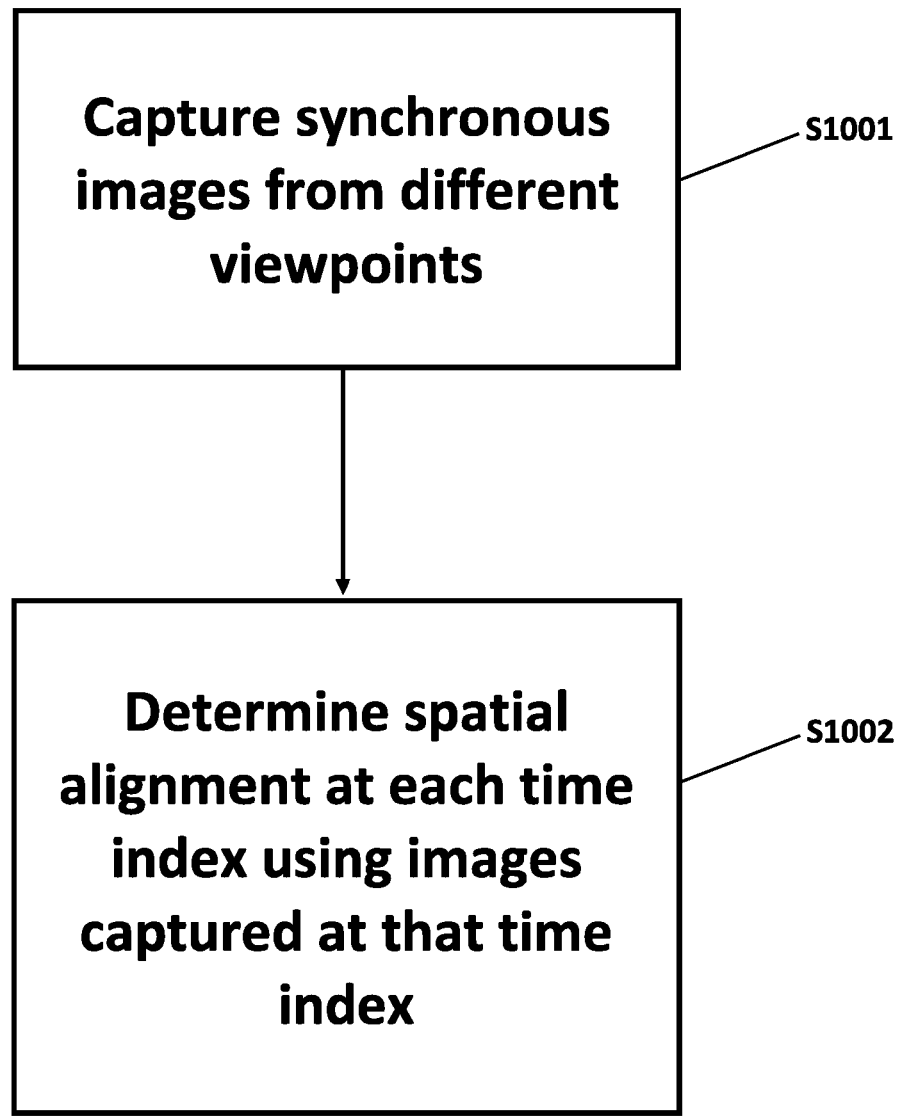
FIG. 10 is a schematic flowchart of a second example method of determining a spatial relationship between the upper teeth and lower teeth of the patient.

FIG. 10 illustrates a method of determining the spatial relationship between the upper and lower teeth U1, L1, for example using the cameras 200A, 200B.

In block S1001, the cameras 200A,B capture the synchronous images. In block S1002, the spatial alignment of the upper teeth U1 and lower teeth L1 are calculated for a time index, based on images captured at that time index.

As discussed above, in the methods of FIG. 1-6, it is assumed that the upper teeth U1 and lower teeth L1 remain in the same spatial alignment in all images captured by the camera 101, and thus an optimal alignment solution is found based on the plurality of images captured by the camera 101 as it is passed around the patient's face or the models held in occlusion.

In contrast, in the method of FIG. 9-10, each pair of images synchronously captured by the cameras 200A,B necessarily show the upper teeth U1 and lower teeth L2 in the same spatial alignment, by virtue of being captured at the same time. Accordingly, the method outlined above in relation to FIG. 1-6 may be applied to each pair of synchronously captured images, so that the alignment is determined at each time index.

This allows for a dynamic determination of the spatial alignment of the upper teeth U1 and lower teeth L2. By obtaining and combining 2 (or more) sets of costs per frame, the robustness and convergence properties of the optimisation may be improved. Accordingly, only one snap-shot of the teeth (i.e. from 2 or more simultaneous images) can robustly align the 3D scans. Accordingly, by capturing a video of the upper teeth U1 and lower teeth L2 in motion (e.g. whilst chewing), a record of the interaction between the upper teeth U1 and lower teeth L2 can be derived. This may then be used by a dental technician to ensure prosthetics such as crowns are designed in harmony with the patient's chewing motion.

Figure 11A:
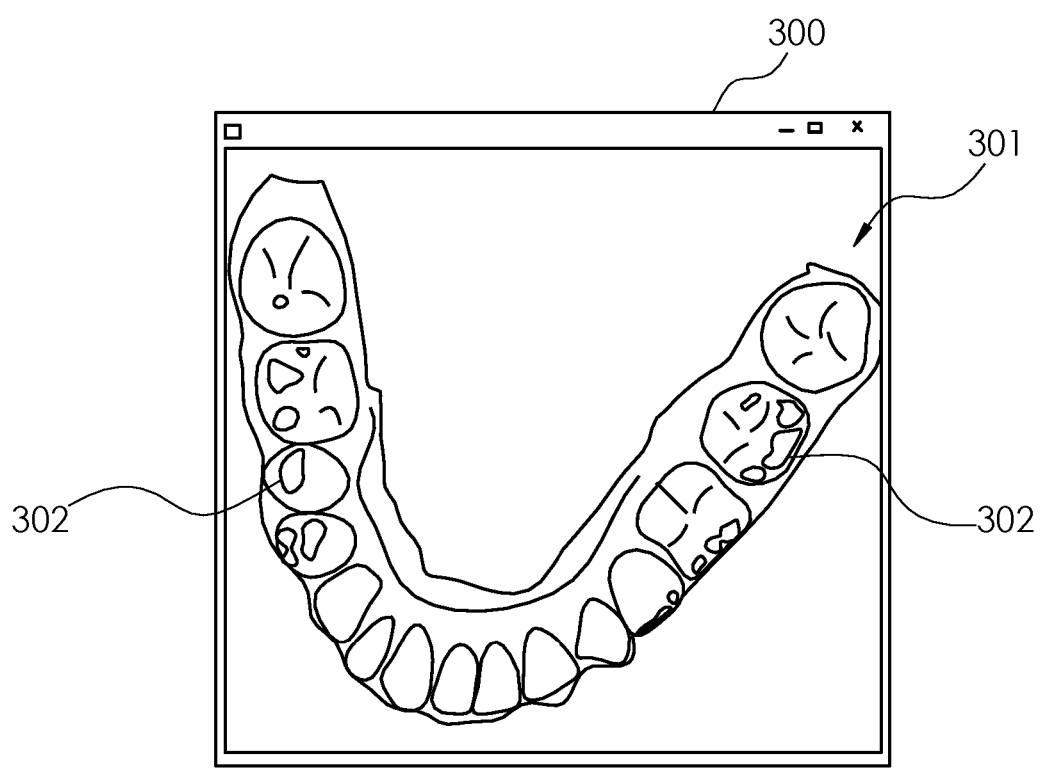
FIGS. 11A and 11B are example GUIs illustrating contact between the upper teeth and lower teeth of the patient.
Figure 11B:
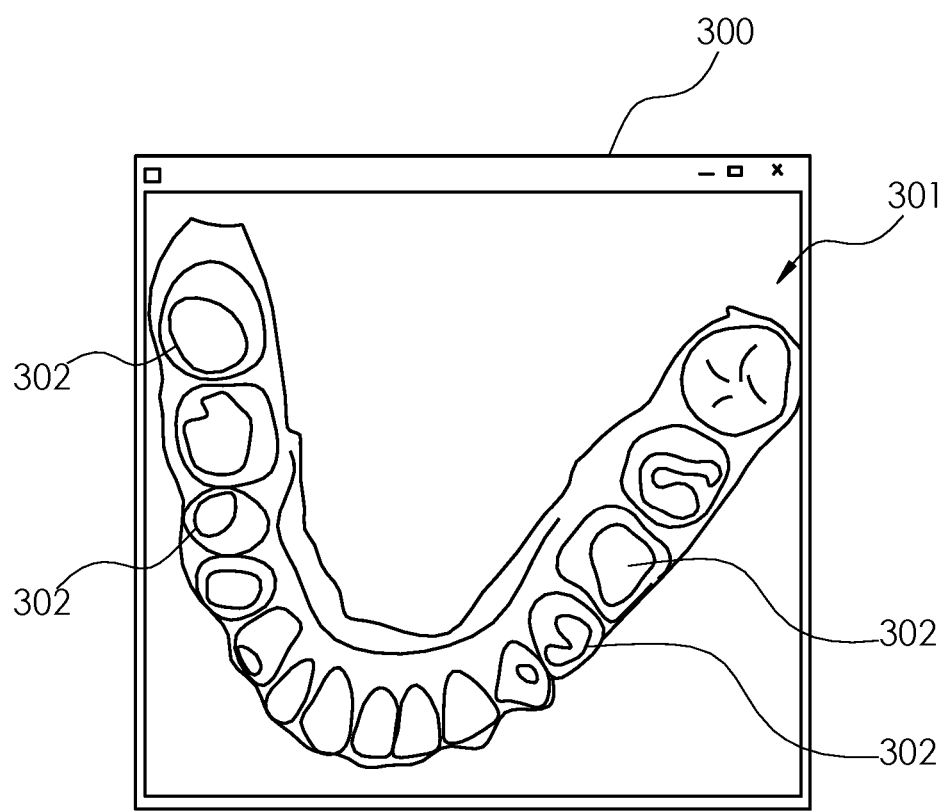

In one example, the contact between the upper teeth U1 and lower teeth L2 at each time index can be displayed to a user via a GUI. For example, FIG. 11A shows a GUI 300, which is displaying a 3D model 301 of the lower teeth L1. Regions 302 of the lower teeth L1 which are in contact with the upper teeth U1 at a particular time index T1, are highlighted. For example, the regions 302 may be displayed in a different colour on the GUI 300. FIG. 11B shows the same model 301 at a different time index T2, at which point there is more contact between the lower teeth L1 and the upper teeth U1. The GUI 300 may sequentially display the contact between the teeth U1/L1 at each time index, so as to display an animated video indicating the contact between the teeth U1/L1 throughout the captured images. Accordingly, a dental technician may readily appreciate the contact between the teeth U1/L1 during for example a chewing motion, assisting the user in designing an appropriate prosthetic. Furthermore, the data may be imported into dental CAD packages, to allow diagnosis and prosthesis design in harmony with the patient's jaw movements.

Whilst the example above involves two cameras 200A,B, in other examples more cameras may be positioned around the mouth of patient P, and configured to synchronously capture images. In such examples, the method outlined above in relation to FIG. 1-6 may be applied to all images captured at a particular time index by the plurality of cameras.

Figure 12:
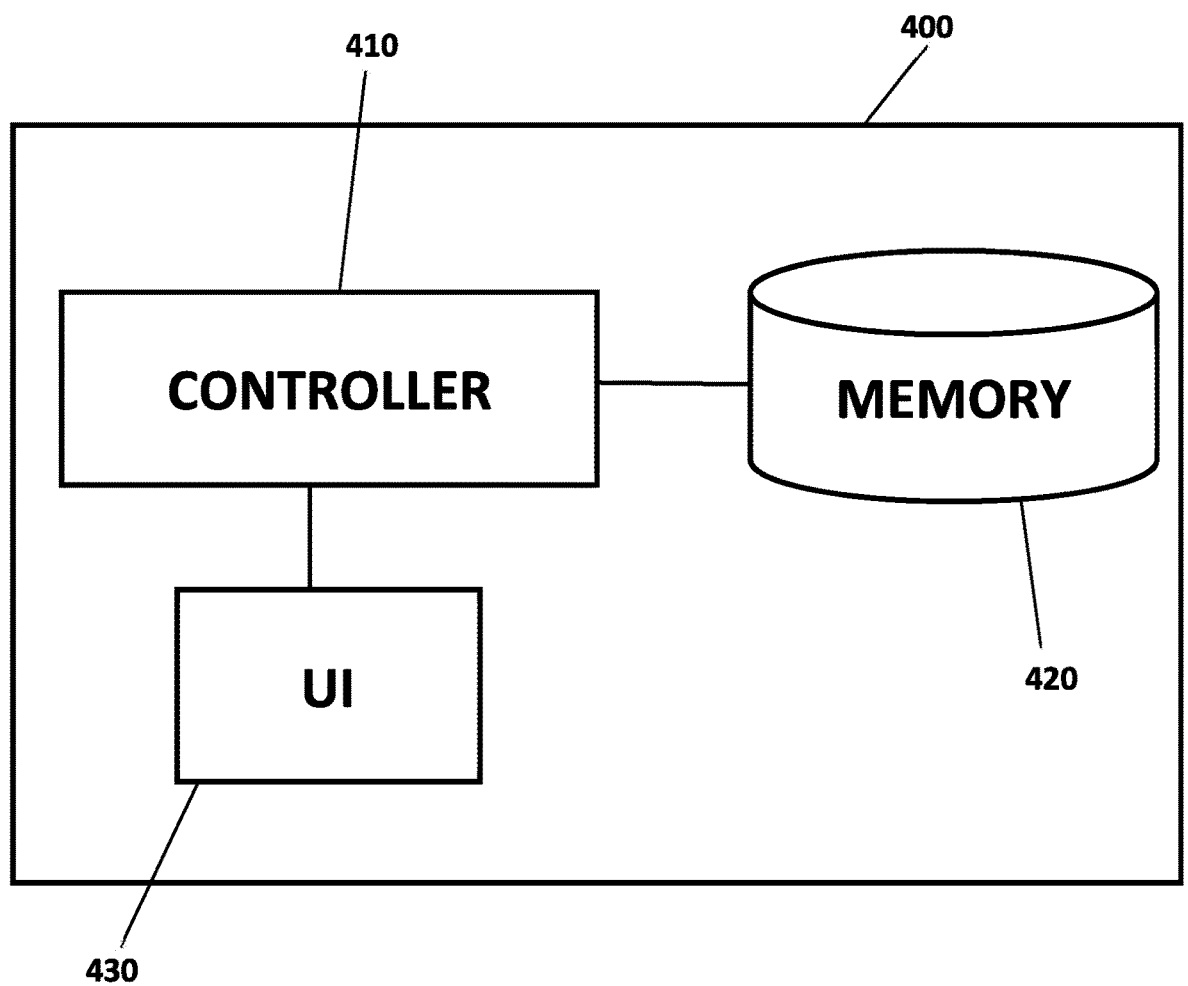
FIG. 12 is a schematic block diagram of an example system for determining a spatial relationship between the upper teeth and the lower teeth of the patient.

FIG. 12 shows an example system 400 for determining the spatial relationship between upper and lower teeth. The system 400 comprises a controller 410. The controller may comprise a processor or other compute element such as a field programmable gate array (FPGA), graphics processing unit (GPU) or the like. In some examples, the controller 410 comprises a plurality of compute elements. The system also comprises a memory 420. The memory 420 may comprise any suitable storage for storing, transiently or permanently, any information required for the operation of the system 400. The memory 420 may comprise random access memory (RAM), read only memory (ROM), flash storage, disk drives and any other type of suitable storage media. The memory 420 stores instructions that, when executed by the controller 410, cause the system 400 to perform any of the methods set out herein. In further examples, the system 400 comprises a user interface 430, which may comprise a display and input means, such as a mouse and keyboard or a touchscreen. The user interface 430 may be configured to display the GUI 300. In further examples, the system 400 may comprise a plurality of computing devices, each comprising a controller and a memory, and connected via a network.

Various modifications may be made to the examples discussed herein within the scope of the invention. For example, it will be appreciated that the order in which the 3D models and 2D images are received may be altered. For example, the 2D images could be captured before the scanning of the 3D models. Whilst the examples above discuss determining the position of the upper teeth with respect to the camera(s) and then aligning the lower teeth thereto, it will be appreciated that instead the position of the lower teeth may be determined with respect to the camera(s), before aligning the upper teeth to the lower teeth.

Whilst reference is made herein to the camera 101 of a smartphone 100, it will be appreciated that any suitable portable camera may be employed.

Advantageously, the above-described systems and methods provide a method of determining the alignment of the upper and lower teeth, which take advantage of the prior knowledge of the tooth shape obtained via a 3D scan. This allows for the spatial relationship to be determined based on videos captured by cameras, such as those present in smartphones.

Accordingly, no expensive, specialist equipment beyond that available to an ordinary dental practitioner is required. Furthermore, the above-described methods and system advantageously do not require equipment to be sited intra-orally, thereby allowing the patient to move their jaw naturally.

At least some of the examples described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some examples, the described elements may be configured to reside on a tangible, persistent, addressable storage medium and may be configured to execute on one or more processors. These functional elements may in some examples include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example examples have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example may be combined with features of any other example, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claim, abstract and drawings), and/or all of the steps of any method or process so disclosed, may be combined in any combination, except combinations where at least some of such features and/or steps are mutually exclusive.

Each feature disclosed in this specification (including any accompanying claim, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claim, abstract and drawings), or to any novel one, or any novel combination, of the steps of any method or process so disclosed.

The invention claimed is:

1. A computer-implemented method comprising:
receiving a 3D model of upper teeth of a patient and a 3D model of lower teeth of the patient;
receiving a plurality of 2D images, each image representative of at least a portion of the upper teeth and lower teeth of the patient; and
determining, based on the 2D images, a spatial relationship between the upper teeth and lower teeth of the patient;
wherein determining, based on the 2D images, a spatial relationship between the upper teeth and lower teeth of the patient, comprises:
determining an optimal alignment of the 2D images to one of the 3D model of upper teeth and the 3D model of lower teeth; and
determining an optimal alignment between the one of the 3D model of upper teeth and the 3D model of the lower teeth and the other of the 3D model of upper teeth of a patient and the 3D model of lower teeth;
wherein determining the optimal alignment comprises, for each of the 2D images:
rendering a 3D scene based on a current estimate of a camera pose at which one the 2D image was captured and the spatial relationship between the 3D model of upper teeth of a patient and the 3D model of lower teeth;
extracting a 2D rendering from the rendered 3D scene based on the current estimate of the camera pose; and comparing the 2D rendering to the 2D image to determine a cost score indicative of a level of difference between the 2D rendering and the 2D image.

2. The method of claim 1, comprising using a non-linear optimiser to iteratively obtain the optimal alignment over all of the 2D images.

3. The method of claim 2, wherein the cost scores used in each iteration by the optimiser differ.

4. The method of claim 1, wherein the cost score comprises a mutual information score calculated between the rendering and the 2D image.

5. The method of claim 1, wherein the cost score comprises a similarity score of corresponding image features extracted from the rendering and the 2D image.

6. The method of claim 5, wherein the image features are corner features, edge features or image gradient features.

7. The method of claim 5, wherein the similarity score is one of Euclidian distance, random sampling or one-to-oneness.

8. The method of claim 1, wherein the cost score comprises a 2d-3d-2d-2d cost, calculated by:
  extracting 2D image features from the rendered 3D scene;
  re-projecting the extracted features on to the rendered 3D scene;
  extracting image features from the 2D image;
  re-projecting the extracted features from the 2D image onto the rendered 3D scene, and calculating a similarity measure indicative of the difference between the re-projected features in 3D space.

9. The method of claim 1, wherein the cost score comprises an optical flow cost, calculated by tracking pixels between consecutive images of the plurality of 2D images.

10. The method of claim 1 comprising determining a plurality of different cost scores based on different extracted features and/or similarity measures.

11. The method of claim 1, wherein the plurality of 2D images each show the upper teeth and the lower teeth in substantially the same static alignment.

12. The method of claim 1, wherein the plurality of 2D images each comprise at least a portion of the upper teeth and lower teeth of the patient.

13. The method of claim 1, wherein the plurality of 2D images each comprise at least a portion of a dental model of the upper teeth of the patient and a dental model of the lower teeth of the patient in occlusion.

14. The method of claim 13, comprising determining an optimal alignment of the 2D images to one of the 3D model of the upper teeth and the 3D model of the lower teeth, based on markers placed on the corresponding dental model.

15. The method of claim 1, comprising:
  determining a first spatial relationship between the upper teeth and lower teeth of the patient in a first position;
  determining a second spatial relationship between the upper teeth and lower teeth of the patient in a second position;
  determining a spatial transformation between the first spatial relationship and the second relationship.

16. The method of claim 15, wherein determining the spatial transformation comprises determining a transverse hinge axis.

17. The method of claim 1, wherein:
  the plurality of 2D images comprises a plurality of sets of 2D images, each set of 2D images comprising concurrently captured images of the face of the patient from different viewpoints, and
  the method comprises determining the spatial relationship based on each set of 2D images.

18. The method of claim 17, comprising determining a region of the 3D model of the upper teeth that is in contact with the 3D model of the lower teeth in each set of 2D images, and displaying the region on a 3D model of the upper teeth or lower teeth.

19. The method of claim 1, wherein said determining, based on the 2D images, the spatial relationship between the upper teeth and the lower teeth of the patient comprises the spatial relationship being a dynamic relationship.

20. The method of claim 1, wherein receiving the plurality of 2D images comprises receiving the plurality of 2D images showing the upper teeth and the lower teeth of the patient in the inter-occlusal position.

21. A computer-implemented method comprising:
  receiving a 3D model of upper teeth of a patient and a 3D model of lower teeth of the patient;
  receiving a plurality of 2D images, each image representative of at least a portion of the upper teeth and lower teeth of the patient; and
  determining, based on the 2D images, a spatial relationship between the upper teeth and lower teeth of the patient;
  wherein said receiving the 3D model of upper teeth of the patient and the 3D model of lower teeth of the patient comprises receiving the 3D model of upper teeth of the patient separately from the 3D model of lower teeth of the patient.

22. A computer-implemented method comprising:
  receiving a 3D model of upper teeth of a patient and a 3D model of lower teeth of the patient;
  receiving a plurality of 2D images, each image representative of at least a portion of the upper teeth and lower teeth of the patient; and
  determining, based on the 2D images, a spatial relationship between the upper teeth and lower teeth of the patient;
  wherein receiving the plurality of 2D images comprises receiving the plurality of 2D images showing the upper teeth and the lower teeth of the patient in the maximum inter-cuspal position.

* * * * *